United States Patent

Tronser

[15] 3,675,288
[45] July 11, 1972

[54] PROCESS OF MANUFACTURING A TRIMMER CAPACITOR

[72] Inventor: Alfred Tronser, 7541 Engelsbrand, Germany
[22] Filed: Sept. 23, 1970
[21] Appl. No.: 74,769

[52] U.S. Cl. ............... 29/25.41, 29/416, 29/418, 317/253
[51] Int. Cl. ............................................. H01g 13/00
[58] Field of Search ............ 29/25.41, 416, 418; 317/251, 317/252, 253, 254

[56] References Cited

UNITED STATES PATENTS

| 3,083,444 | 4/1963 | Mitchell et al. | 29/418 X |
| 3,129,364 | 4/1964 | Oxley | 317/253 |
| 3,262,033 | 7/1966 | Culbertson | 317/253 |

Primary Examiner—John F. Campbell
Assistant Examiner—Carl E. Hall
Attorney—Spencer & Kaye

[57] ABSTRACT

A single length of profiled stock is machined in a single operation with a single tool to form a rotor portion and a stator portion integral therewith. The rotor and stator portions are subsequently separated from each other by an axial cut and a transverse cut. The separated rotor and stator portions are assembled to form a trimmer capacitor.

1 Claim, 3 Drawing Figures

PATENTED JUL 11 1972 3,675,288

INVENTOR
Alfred Tronser

BY *Spencer & Kaye*

ATTORNEYS.

PROCESS OF MANUFACTURING A TRIMMER CAPACITOR

This invention relates to a process of manufacturing trimmer capacitors.

It is known to manufacture trimmer capacitor which comprises a rotor and a stator which are milled or turned from profiled stock. In that known process, different profiled stock must be used for the rotor and the stator so that these two parts must be made in two separate operations.

This gives rise to the necessity to maintain so close tolerances for the tool sets used to mill the rotor and stator plates that the spacing of the milled rotor and stator plates are substantially the same. In the finished capacitor, the rotor plates move into the spaces between the stator plates and the resulting air gaps should be of equal width throughout the set of plates whereas the use of a plurality of tool sets having larger tolerances results in differences in the size of these gaps. The occurrence of such differences limits the number of plates which may be used and imposes a lower limit on the width of the air gap. These two parameters are of great significance for the utility of the trimmer capacitors because the number of plates determines the capacitance range and the air gap determines the overall height.

In the process according to the invention, this difficulty is eliminated in that rotor and stator portions are machined in a single operation in a single piece of profiled stock by means of a single tool and are subsequently separated by an axial cut and a horizontal cut.

An embodiment of the invention is shown by way of example diagrammatically and partly in section in the drawing, in which FIG. 1 is a transverse sectional view showing a length of profiled stock in which a rotor and stator are jointly machined.

Figure 3:
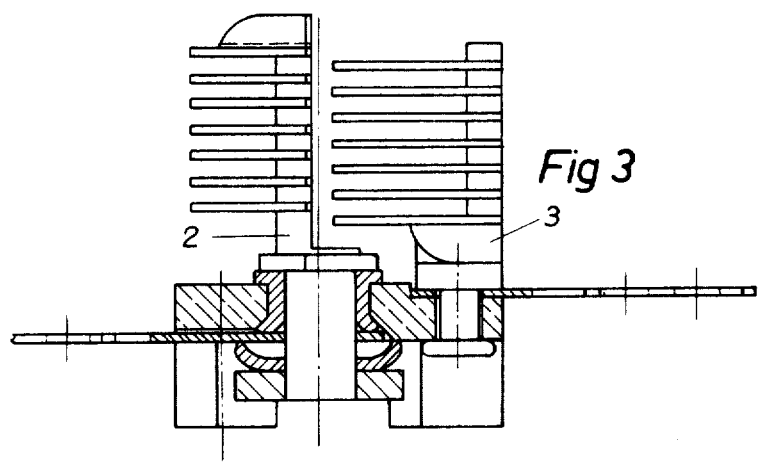
FIG. 3 is a side elevation showing a finished trimmer capacitor.
Figure 2:
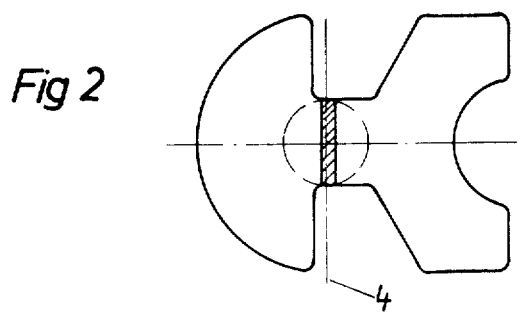
FIG. 2 is a longitudinal sectional view showing the machined length of profiled stock.
Figure 1:
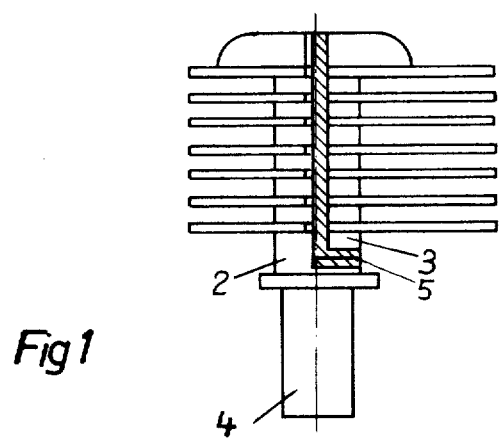

In the length of profiled material shown in FIG. 1, the rotor portion is designated 2 and the stator portion is designated 3. When the machining operation has been performed, the stator and rotor are separated by an axial cut taken on line 4 and a transverse cut taken on line 5 and are assembled in known manner to form the complete trimmer capacitor shown in FIG. 3.

The mode of manufacture is applicable to normal trimmer capacitors having a linear capacitance curve or a non-linear capacitance curve. The method of manufacture may also be used to make differential capacitors and butterfly capacitors. In these cases, it will be sufficient to change the profile of the raw material.

I claim:

1. A process for manufacturing a trimmer capacitor having a rotor and a stator, each of which comprises a plurality of spaced plates held together by a common integral portion comprising the steps of:
    a. machining a single length of profiled stock in a single operation with a single tool to form the plates of both a rotor portion and a stator portion of said length, said rotor and stator portions being integral with one another and with the rotor and stator plates extending away from one another;
    b. cutting the machined stock in the direction of its length, from one end thereof, along a plane between the rotor and stator plates, to a point intermediate the ends of the stock, and also cutting the machined stock in a direction transverse to the length of the stock, from a side edge thereof, and along a plane passing through the intermediate point, so as to separate the rotor and stator portions; and
    c. assembling the separated rotor and stator portions to form a trimmer capacitor.

* * * * *